(12) United States Patent
Liu et al.

(10) Patent No.: US 12,526,680 B2
(45) Date of Patent: Jan. 13, 2026

(54) IDENTIFIER CONFIGURATION TO SUPPORT QUALITY OF EXPERIENCE MEASUREMENTS

(71) Applicant: QUALCOMM Incorporated, San Diego, CA (US)

(72) Inventors: Jianhua Liu, Beijing (CN); Xipeng Zhu, San Diego, CA (US); Shankar Krishnan, San Diego, CA (US); Rajeev Kumar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 315 days.

(21) Appl. No.: 18/551,312

(22) PCT Filed: May 8, 2021

(86) PCT No.: PCT/CN2021/092349
§ 371 (c)(1),
(2) Date: Sep. 19, 2023

(87) PCT Pub. No.: WO2022/236464
PCT Pub. Date: Nov. 17, 2022

(65) Prior Publication Data
US 2024/0172027 A1    May 23, 2024

(51) Int. Cl.
*H04W 24/10* (2009.01)
*H04L 69/321* (2022.01)

(52) U.S. Cl.
CPC .......... *H04W 24/10* (2013.01); *H04L 69/321* (2013.01)

(58) Field of Classification Search
None
See application file for complete search history.

(56) References Cited

U.S. PATENT DOCUMENTS

2021/0345072 A1*  11/2021  Selvanesan ........... H04W 4/027
2021/0410107 A1*  12/2021  Park ..................... H04W 68/02
2025/0220394 A1*  7/2025   Selvanesan ........... H04W 4/08

FOREIGN PATENT DOCUMENTS

WO    2021028397 A1    2/2021

OTHER PUBLICATIONS

International Search Report and Written Opinion—PCT/CN2021/092349—ISA/EPO—Nov. 16, 2021.

(Continued)

*Primary Examiner* — Clemence S Han
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station, a quality of experience (QoE) configuration message that includes an access stratum identifier, wherein the access stratum identifier is a shortened version of an application-level identifier associated with one or more QoE configurations. The UE may obtain application layer QoE measurements. The UE may transmit, to the base station, a QoE report that includes the application layer QoE measurements, wherein the QoE report includes the access stratum identifier to indicate that the QoE report is associated with the application-level identifier or the one or more QoE configurations. Numerous other aspects are described.

30 Claims, 8 Drawing Sheets

(56) References Cited

OTHER PUBLICATIONS

Qualcomm Inc., "NR QoE Curation and Reporting", 3GPP Draft, 3GPP TSG-RAN WG3 Meeting #112e, R3-211732, 3rd Generation Partnership Project (3GPP), Mobile Competence Centre, 650, Route Des Lucioles, F-06921 Sophia-Antipolis Cedex, France, vol. RAN WG3, No. E-Meeting, May 17, 2021-May 27, 2021, May 7, 2021 (May 7, 2021), XP052002021, 5 Pages, Section 2 .1.1, p. 2-p. 3.
ZTE, et al., "Discussion on NR QoE Configuration", 3GPP Draft, 3GPP TSG-RAN WG3 #112-e, R3-212435, 3rd Generation Partnership Project (3GPP), Mobile Competence Centre, 650, Route Des Lucioles, F-06921 Sophia-Antipolis Cedex, France, vol. RAN WG3, No. Online, May 17, 2021-May 28, 2021, May 7, 2021 (May 7, 2021), XP052002479, 5 Pages, Section 2.1, p. 2-p. 3.

\* cited by examiner

IDENTIFIER CONFIGURATION TO SUPPORT QUALITY OF EXPERIENCE MEASUREMENTS

CROSS-REFERENCE TO RELATED APPLICATION

This application is a 371 national stage of Patent Cooperation Treaty (PCT) Application No. PCT/CN2021/092349 filed on May 8, 2021, entitled "IDENTIFIER CONFIGURATION TO SUPPORT QUALITY OF EXPERIENCE MEASUREMENTS," which is hereby expressly incorporated by reference herein.

FIELD OF THE DISCLOSURE

Aspects of the present disclosure generally relate to wireless communication and to techniques and apparatuses associated with an identifier configuration to support quality of experience (QoE) measurements.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory and one or more processors, coupled to the memory, configured to: receive, from a base station, a quality of experience (QoE) configuration message that includes an access stratum identifier, wherein the access stratum identifier is a shortened version of an application-level identifier associated with one or more QoE configurations; obtain application layer QoE measurements; and transmit, to the base station, a QoE report that includes the application layer QoE measurements, wherein the QoE report includes the access stratum identifier to indicate that the QoE report is associated with the application-level identifier or the one or more QoE configurations.

In some aspects, a base station for wireless communication includes a memory and one or more processors, coupled to the memory, configured to: transmit, to a UE, a QoE configuration message that includes an access stratum identifier, wherein the access stratum identifier is a shortened version of an application-level identifier associated with one or more QoE configurations; receive, from the UE, a QoE report that includes application layer QoE measurements, wherein the QoE report includes the access stratum identifier to indicate that the QoE report is associated with the application-level identifier or the one or more QoE configurations; and forward the application layer QoE measurements to an operations, administration, and management (OAM) server based at least in part on the application-level identifier associated with the access stratum identifier included in the QoE report.

In some aspects, a method of wireless communication performed by a UE includes receiving, from a base station, a quality of experience (QoE) configuration message that includes an access stratum identifier, wherein the access stratum identifier is a shortened version of an application-level identifier associated with one or more QoE configurations; obtaining application layer QoE measurements; and transmitting, to the base station, a QoE report that includes the application layer QoE measurements, wherein the QoE report includes the access stratum identifier to indicate that the QoE report is associated with the application-level identifier or the one or more QoE configurations.

In some aspects, a method of wireless communication performed by a base station includes transmitting, to a UE, a QoE configuration message that includes an access stratum identifier, wherein the access stratum identifier is a shortened version of an application-level identifier associated with one or more QoE configurations; receiving, from the UE, a QoE report that includes application layer QoE measurements, wherein the QoE report includes the access stratum identifier to indicate that the QoE report is associated with the application-level identifier or the one or more QoE configurations; and forwarding the application layer QoE measurements to an OAM server based at least in part on the application-level identifier associated with the access stratum identifier included in the QoE report.

In some aspects, a non-transitory computer-readable medium storing a set of instructions for wireless communication includes one or more instructions that, when executed by one or more processors of a UE, cause the UE to: receive, from a base station, a quality of experience (QoE) configuration message that includes an access stratum identifier, wherein the access stratum identifier is a shortened version of an application-level identifier associated with one or more QoE configurations; obtain application layer QoE measurements; and transmit, to the base station, a QoE report that includes the application layer QoE measurements, wherein the QoE report includes the access stratum identifier to indicate that the QoE report is associated with the application-level identifier or the one or more QoE configurations.

In some aspects, a non-transitory computer-readable medium storing a set of instructions for wireless communication includes one or more instructions that, when executed by one or more processors of a base station, cause the base station to: transmit, to a UE, a QoE configuration message that includes an access stratum identifier, wherein the access stratum identifier is a shortened version of an application-level identifier associated with one or more QoE configurations; receive, from the UE, a QoE report that includes application layer QoE measurements, wherein the QoE report includes the access stratum identifier to indicate that the QoE report is associated with the application-level identifier or the one or more QoE configurations; and forward the application layer QoE measurements to an OAM server based at least in part on the application-level identifier associated with the access stratum identifier included in the QoE report.

In some aspects, an apparatus for wireless communication includes means for receiving, from a base station, a quality of experience (QoE) configuration message that includes an access stratum identifier, wherein the access stratum identifier is a shortened version of an application-level identifier associated with one or more QoE configurations; means for obtaining application layer QoE measurements; and means for transmitting, to the base station, a QoE report that includes the application layer QoE measurements, wherein the QoE report includes the access stratum identifier to indicate that the QoE report is associated with the application-level identifier or the one or more QoE configurations.

In some aspects, an apparatus for wireless communication includes means for transmitting, to a UE, a QoE configuration message that includes an access stratum identifier, wherein the access stratum identifier is a shortened version of an application-level identifier associated with one or more QoE configurations; means for receiving, from the UE, a QoE report that includes application layer QoE measurements, wherein the QoE report includes the access stratum identifier to indicate that the QoE report is associated with the application-level identifier or the one or more QoE configurations; and means for forwarding the application layer QoE measurements to an OAM server based at least in part on the application-level identifier associated with the access stratum identifier included in the QoE report.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
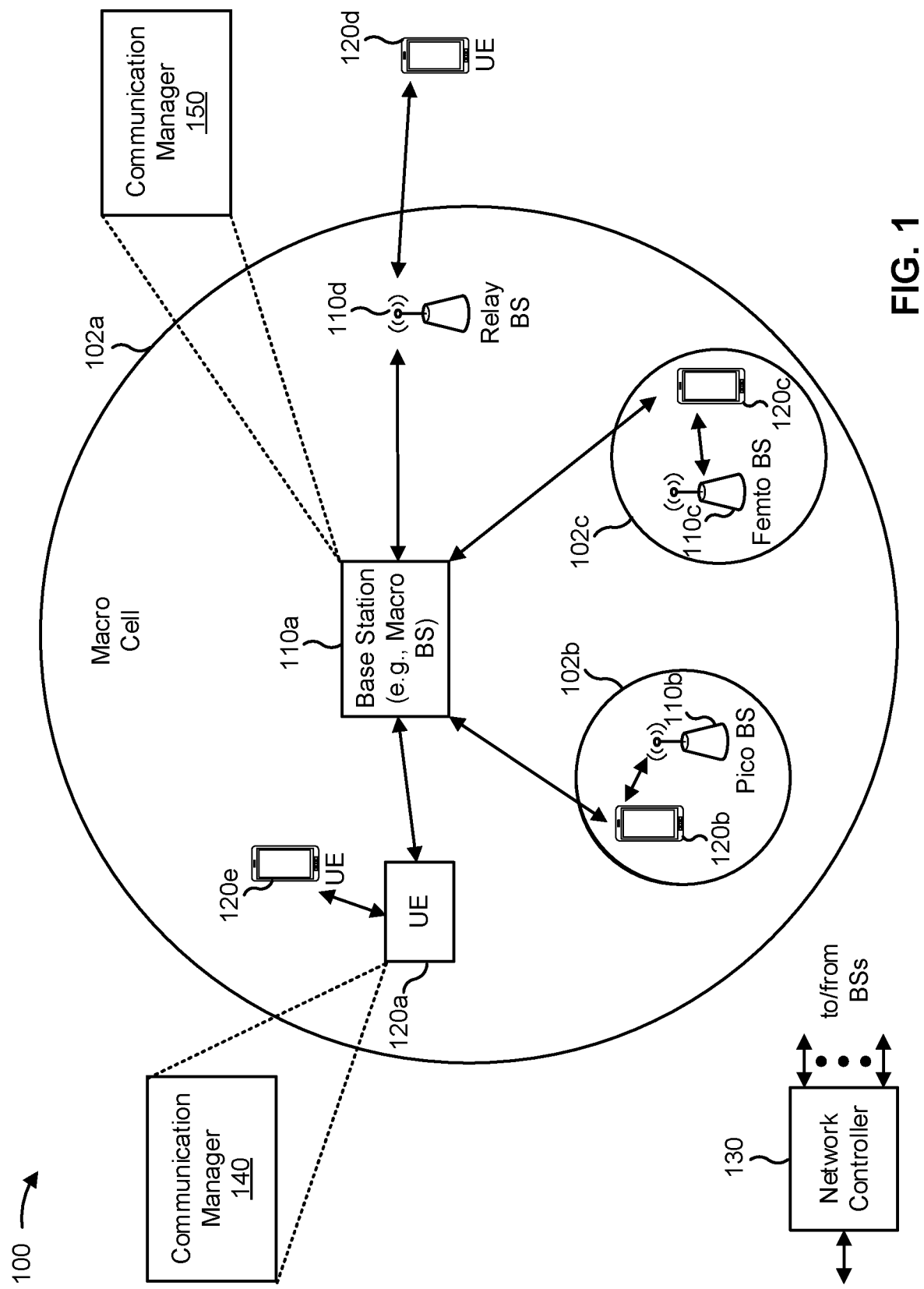
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, the UE 120 may include a communication manager 140. As described in more detail elsewhere herein, the communication manager 140 may receive, from a base station 110, a quality of experience (QoE) configuration message that includes an access stratum identifier, wherein the access stratum identifier is a shortened version of an application-level identifier associated with one or more QoE configurations; obtain application layer QoE measurements; and transmit, to the base station 110, a QoE report that includes the application layer QoE measurements, wherein the QoE report includes the access stratum identifier to indicate that the QoE report is associated with the application-level identifier or the one or more QoE configurations. Additionally, or alternatively, the communication manager 140 may perform one or more other operations described herein.

In some aspects, the base station 110 may include a communication manager 150. As described in more detail elsewhere herein, the communication manager 150 may transmit, to a UE 120, a QoE configuration message that includes an access stratum identifier, wherein the access stratum identifier is a shortened version of an application-level identifier associated with one or more QoE configurations; receive, from the UE 120, a QoE report that includes application layer QoE measurements, wherein the QoE report includes the access stratum identifier to indicate that the QoE report is associated with the application-level identifier or the one or more QoE configurations; and forward the application layer QoE measurements to an operations, administration, and management (OAM) server based at least in part on the application-level identifier associated with the access stratum identifier included in the QoE report. Additionally, or alternatively, the communication manager 150 may perform one or more other operations described herein.

As indicated above, FIG. 1 is provided as an example. Other examples may differ from what is described with regard to FIG. 1.

Figure 2:
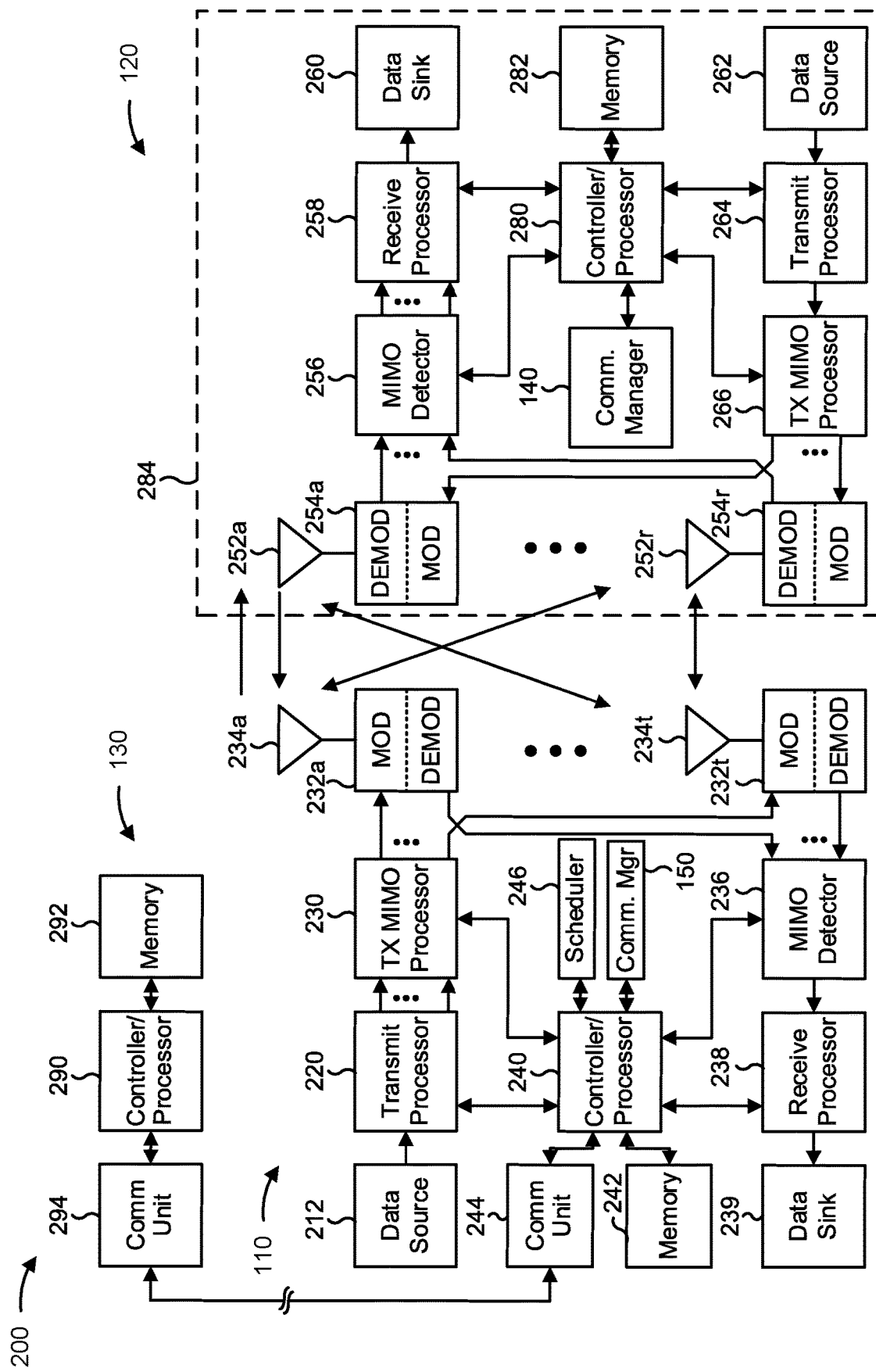
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥ 1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (e.g., as described with reference to FIGS. 4-6).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (e.g., as described with reference to FIGS. 4-6).

Controller/processor 240 of base station 110, controller/processor 280 of UE 120, and/or any other component(s) of FIG. 2 may perform one or more techniques associated with an identifier configuration to support quality of experience (QoE) measurements, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some aspects, executing instructions may include running the instructions, converting the instructions, compiling the instructions, and/or interpreting the instructions, among other examples.

In some aspects, the UE 120 includes means for receiving, from the base station 110, a QoE configuration message that includes an access stratum identifier, wherein the access stratum identifier is a shortened version of an application-level identifier associated with one or more QoE configurations; means for obtaining application layer QoE measurements; and/or means for transmitting, to the base station 110, a QoE report that includes the application layer QoE measurements, wherein the QoE report includes the access stratum identifier to indicate that the QoE report is associated with the application-level identifier or the one or more QoE configurations. The means for the UE 120 to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some aspects, the base station includes means for transmitting, to the UE 120, a QoE configuration message that includes an access stratum identifier, wherein the access stratum identifier is a shortened version of an application-level identifier associated with one or more QoE configurations; means for receiving, from the UE 120, a QoE report that includes application layer QoE measurements, wherein the QoE report includes the access stratum identifier to indicate that the QoE report is associated with the application-level identifier or the one or more QoE configurations; and/or means for forwarding the application layer QoE measurements to an operations, administration, and management (OAM) server based at least in part on the application-level identifier associated with the access stratum identifier included in the QoE report. The means for the base station to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
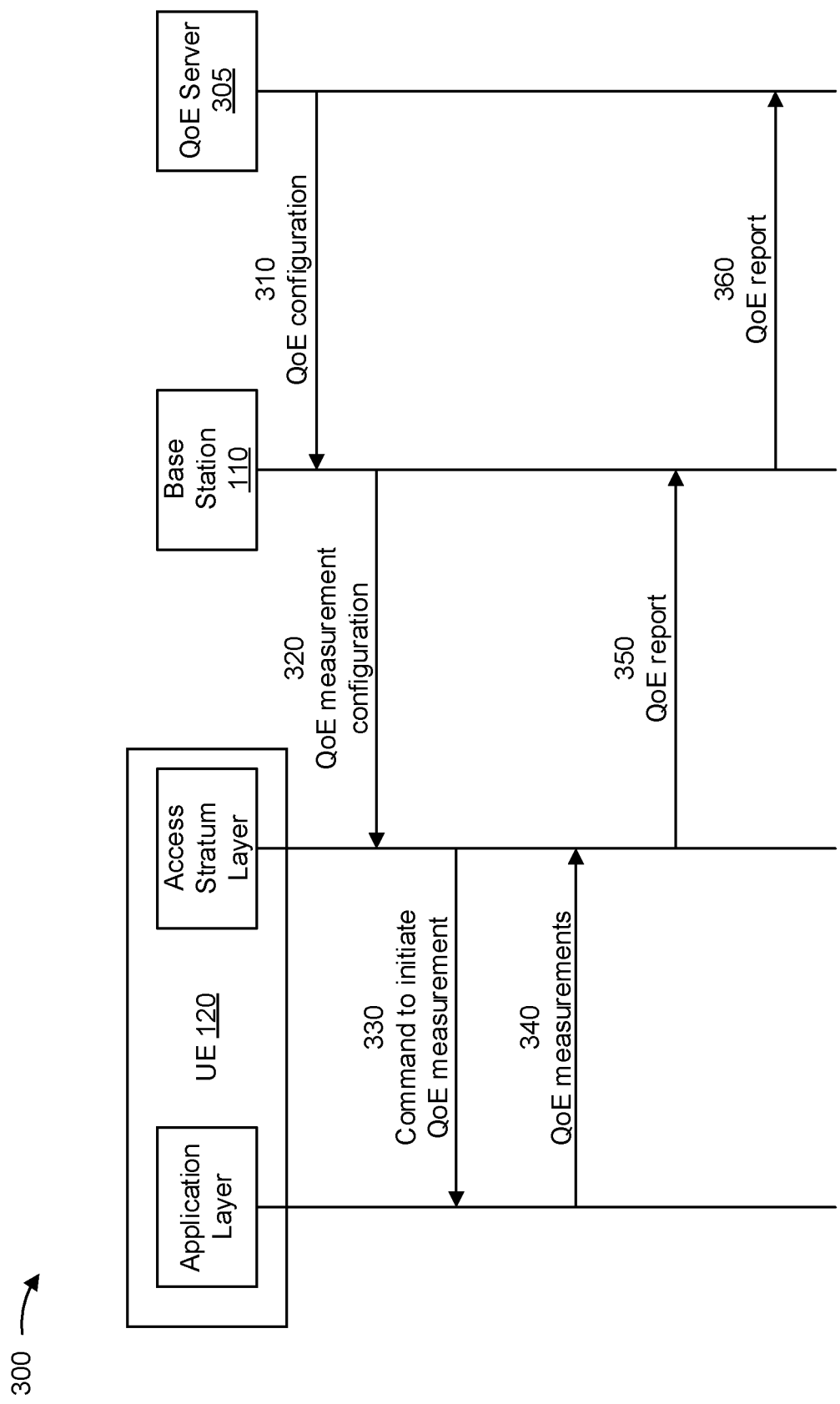
FIG. 3 is a diagram illustrating an example of quality of experience (QoE) measurement configuration and QoE reporting, in accordance with the present disclosure.

FIG. 3 is a diagram illustrating an example 300 of QoE measurement configuration and QoE reporting, in accordance with the present disclosure. "QoE" may refer to a level of satisfaction of a user with a service from a perspective of the user. Example 300 may include communication between a QoE server 305, a base station 110, and a UE 120, which may operate with different layers that involve different functions. For example, the UE 120 may operate with an application layer configured to control operations for an application, such as a video streaming application, and the UE 120 may operate with an access stratum layer that handles commands and data flows between a physical layer and the application layer. The QoE server 305 may be associated with a network operator that uses the base station 110 (e.g., the QoE server 305 may be associated with an OAM system, a control node, or the like). The QoE server 305 may perform operations associated with QoE measurements, such as processing of the QoE information, analysis of the QoE information, determination of key performance indicators (KPIs) based on the QoE information, or the like. For example, in a video streaming application, KPIs may include a video start up time, a rebuffering ratio, a bitrate, a resolution, and/or a latency, among other examples. The UE 120 may be operating in a radio resource control (RRC) connected (e.g., RRC CONNECTED)) state. In addition, the UE 120 may be configured with a signaling radio bearer (SRB), for QoE reporting (e.g., SRB4), for the base station 110.

As shown by reference number 310, the base station 110 may receive, from the QoE server 305, information that identifies a QoE configuration that is to be used by the base station 110 (e.g., for configuring UEs for QoE reporting). For example, the QoE server 305 may transmit to the base station 110 an application layer QoE measurement configuration, for a UE, that is encapsulated in a transparent container. As shown by reference number 320, the base station 110 may transmit, and the UE 120 may receive (e.g., at the access stratum layer of the UE), a QoE measurement configuration (e.g., a QoE measurement configuration based at least in part on the QoE configuration received by the base station 110). For example, the base station 110 may forward to the UE the application layer QoE measurement configuration received from the QoE server 305 (e.g., in a downlink RRC message). As an example, the base station 110 may transmit an RRC reconfiguration (e.g., RR(Reconfiguration) message that indicates the QoE measurement configuration in a measConfigAppLayer information element.

The QoE measurement configuration may identify one or more QoE measurements (e.g., relating to a quality of streaming services used in the UE 120) that are to be collected by the UE 120. "QoE measurement" may refer to a measurement (e.g., relating to bitrate, drop rate, connection failure, jitter, playback time, or the like) that is for use in determining a QoE, a QoE metric, a QoE KPI, or the like. The QoE measurement configuration also may identify one or more service types (e.g., a multimedia telephony service for internet protocol multimedia subsystem (MTSI), a streaming service, and/or a multimedia broadcast multicast service (MBMS), among other examples) for which the UE 120 is to perform QoE measurements.

As shown by reference number 330, the UE 120, via the access stratum layer, may provide, to the application layer of the UE 120, a command to initiate QoE measurement at the application layer. That is, the command may be a command to initiate QoE measurement collection (QMC). The command may be a mobile station modem (MSM) interface/attention (AT) command. As shown by reference number 340, the UE 120, via the application layer, may provide application layer QoE measurements to the access stratum layer. The application layer QoE measurements may be per service type indicated by the QoE measurement configuration.

As shown by reference number 350, the UE 120 may transmit (e.g., using the access stratum layer), and the base station 110 may receive, a QoE report. For example, the UE 120 may encapsulate the application layer QoE measurements from the higher layer of the UE in a transparent container that is transmitted to the base station 110 (e.g., in an uplink RRC message). As an example, the UE 120 may transmit a measReportAppLayer message that includes the QoE report. The QoE report may be based at least in part on the application layer QoE measurements collected by the UE 120. For example, the QoE report may identify the application layer QoE measurements collected by the UE 120 (e.g., per service type). The UE 120 may transmit the QoE report via the SRB for QoE reporting (e.g., SRB4), which is a separate SRB (e.g., separate from current NR SRBs) for the lower-priority (e.g., relative to other SRB transmissions) QoE reporting. In some examples, the base station 110 may transmit to the UE 120 (e.g., via RRC signaling) an indication to pause or resume QoE reporting. As shown by reference number 360, the base station 110 may transmit the QoE report, or information associated with the QoE report, to the QoE server 305.

As described herein, the QoE server 305 and the base station 110 may configure the UE 120 with one or more QoE measurement configurations, and each QoE measurement configuration may be associated with one application-level reference identifier, which may be referred to herein as an application-level identifier. For example, when the base station 110 transmits the downlink RRC message with the measConfigAppl.ayer information element to the UE 120 to provide a QoE measurement configuration to the UE 120, the QoE measurement configuration may be associated with one application-level identifier that the UE 120 configures to the application layer. In general, the application-level identifier may specify a network request session, and is therefore a globally unique identifier that is configured at the UE 120, the base station 110, and the QoE server 305 to manage a QoE measurement configuration. For example, in some cases, the application-level identifier may include a mobile country code (MCC), a mobile network code (MNC), and a QMC identifier, where the QoE server 305 provides the MCC and the MNC to the base station 110 in a trace activation request to identify one public land mobile network (PLMN) that contains the management system for the QoE measurement configuration, and where the QMC identifier is a 3-byte octet string generated by the QoE server 305 or an operator associated with the QoE server 305 to identify a QoE measurement collection job in one or more traffic nodes (e.g., the base station 110) and a QoE measurement collection center (e.g., the QoE server 305).

Furthermore, when the base station 110 provides a QoE measurement configuration to the UE 120, the base station 110 may provide the UE 120 with an access stratum identifier (e.g., an identifier that is configured at the access stratum layer) to identify the QoE measurement configuration at a radio access network (RAN)-level. Additionally, in cases where the QoE server 305 and/or base station 110 configure the UE 120 with multiple QoE measurement configurations, the base station 110 may need to allocate one access stratum identifier to identify each QoE measurement configuration. In general, the base station 110 may include the access stratum identifier associated with a particular QoE measurement configuration in the downlink RRC message that the base station 110 transmits to the UE 120 to provide the QoE measurement configuration to the UE 120, and the UE 120 may include the access stratum identifier associated with the QoE measurement configuration in the uplink RRC message that the UE 120 transmits to the base station 110 to provide the QoE report that includes the application layer QoE measurements. In order to enable the base station 110 to forward the application layer QoE measurements to the correct QoE server 305, the access stratum identifier may have a relationship with the application-level identifier. For example, in some cases, the application-level identifier may be used as the access stratum identifier. However, the application-level identifier is typically a 6-byte octet string that includes an MCC, an MNC, and a QMC identifier. Accordingly, reusing the application-level identifier as the access stratum identifier may significantly increase the RRC signaling overhead.

Some aspects described herein relate to techniques and apparatuses for providing an identifier configuration to support QoE measurements. For example, in some aspects, a QoE measurement configuration may be associated with an access stratum identifier (e.g., an identifier used at an RRC or access stratum level) that is derived from a globally unique application-level identifier associated with the QoE measurement configuration. For example, in some aspects, the access stratum identifier may be a shortened (e.g., truncated) version of the application-level identifier, and the access stratum identifier may be included in RRC messages that are transmitted from a base station to a UE, and in RRC messages that are transmitted from the UE to the base station, to identify messages that relate to a particular QoE measurement configuration. In this way, when the base station receives an RRC message that includes application layer QoE measurements, the base station may determine the application-level identifier mapped to the access stratum identifier included in the received RRC message in order to determine the correct OAM entity (e.g., QoE server) to which to forward the application layer QoE measurements. For example, as described herein, an OAM server that provides a QoE measurement configuration to the base station may indicate an application-level identifier to the base station, and the base station may allocate an access stratum identifier that is derived from the application-level identifier to the QoE measurement configuration. Accordingly, the base station may provide the access stratum identifier to the UE when providing the QoE measurement configuration, such that the base station may map application layer QoE measurements associated with the access stratum identifier to the application-level identifier and thereby determine the correct OAM entity to receive the application layer QoE measurements.

As indicated above, FIG. 3 is provided as an example. Other examples may differ from what is described with regard to FIG. 3.

Figure 4:
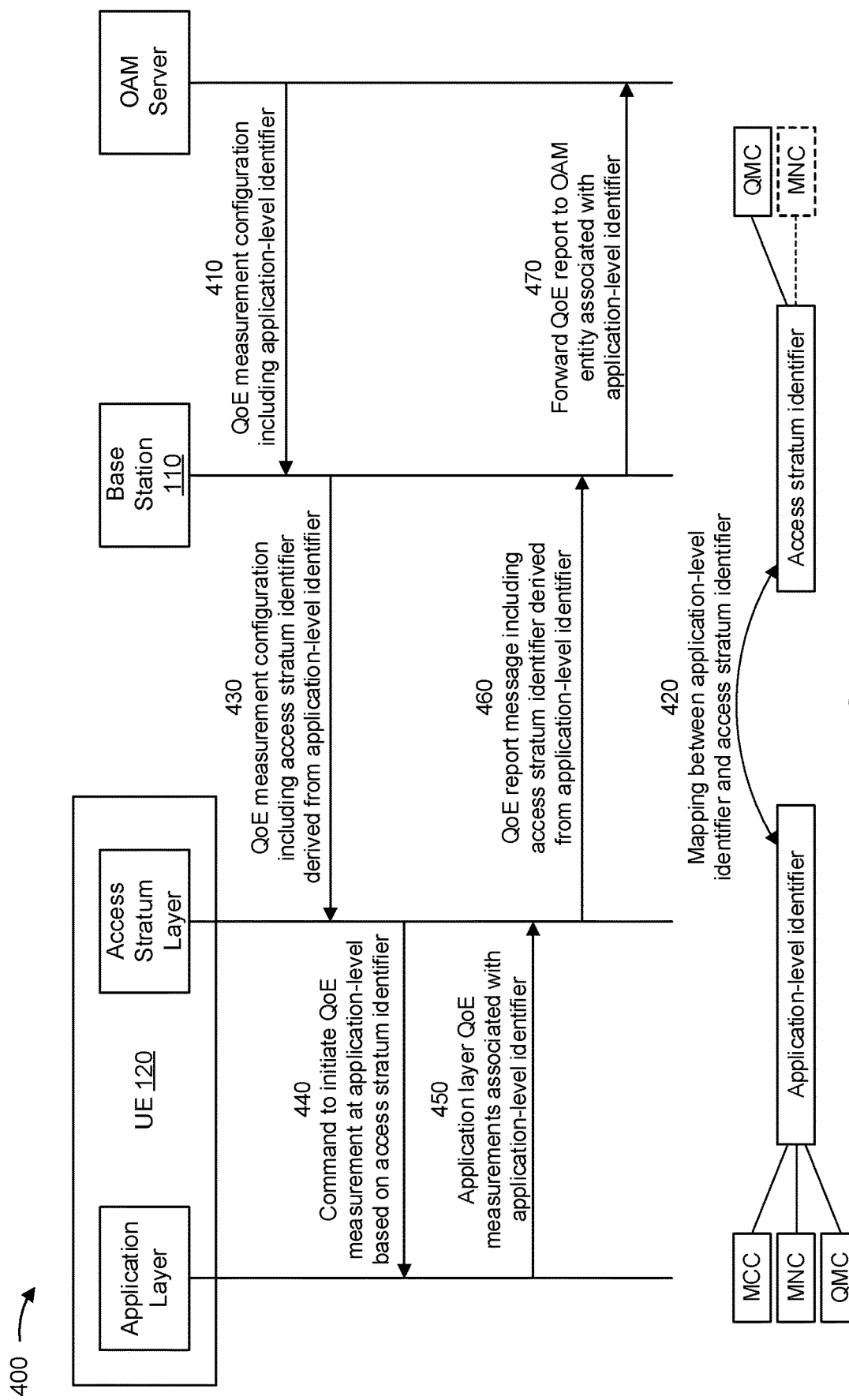
FIG. 4 is a diagram illustrating an example associated with an identifier configuration to support QoE measurements, in accordance with the present disclosure.

FIG. 4 is a diagram illustrating an example 400 associated with an identifier configuration to support QoE measurements, in accordance with the present disclosure. As shown in FIG. 4, example 400 includes communication between a base station 110, a UE 120, and an OAM server (e.g., a QoE server associated with an OAM entity). In some aspects, the base station 110, the UE 120, and the OAM server may be included in a wireless network, such as wireless network 100. The base station 110 and the UE 120 may communicate via a wireless access link, which may include an uplink and a downlink. The base station 110 and the OAM server may communicate via a backhaul interface (e.g., an F1 interface, an NG interface, and/or an X2 interface).

In some aspects, as shown in FIG. 4 and described herein, the UE 120 may operate with different layers that involve different functions related to QoE measurements. For example, the UE 120 may operate with an application layer configured to control operations for an application, such as a video streaming application, and the UE 120 may operate with an access stratum layer that handles commands and data flows between a physical layer and the application layer. The OAM server may be associated with a network operator that uses the base station 110 to manage QoE measurement collection and QoE measurement reporting by the UE 120.

The OAM server may perform operations associated with QoE measurements, such as processing application layer QoE measurements reported by the UE, analyzing the application layer QoE measurements, and/or determining KPIs based on the application layer QoE measurements, among other examples.

As shown in FIG. 4, and by reference number 410, the OAM server may transmit a QoE measurement configuration to the base station 110. For example, as described herein, the QoE measurement configuration provided from the OAM server to the base station 110 may include information that identifies a QoE measurement configuration that the base station 110 is to use to configure the UE 120 for reporting application layer QoE measurements. For example, the OAM server may transmit, to the base station 110, an application layer QoE measurement configuration that is encapsulated in a transparent container for the UE 120. Accordingly, in some aspects, the application layer QoE measurement configuration that the OAM server provides to the base station 110 may include at least an application-level identifier associated with the application layer QoE measurements to be collected and reported by the UE 120. For example, in some aspects, the application-level identifier may be a globally unique identifier, such as a 6-byte octet string that includes a combination of an MCC and an MNC to identify a PLMN that contains the OAM server and a QMC identifier that is generated by the OAM server to identify a QoE measurement collection job to be carried out at the UE 120 (e.g., at the application layer).

As further shown in FIG. 4, and by reference number 420, the base station 110 may allocate an access stratum identifier to identify the QoE measurement configuration at an access stratum layer (e.g., an RRC layer). For example, in some aspects, the access stratum identifier allocated to the QoE measurement configuration may be derived from the application-level identifier associated with the QoE measurement configuration such that the base station 110 may store information related to a mapping between the application-level identifier and the access stratum identifier. In some aspects, the access stratum identifier may be derived from the application-level identifier based on one or more derivation rules, whereby the access stratum identifier may be a shortened (e.g., truncated) version of the application-level identifier. For example, as shown in FIG. 4 and described herein, the application-level identifier may be a globally unique identifier that includes a combination of an MCC, an MNC, and a QMC identifier, and the access stratum identifier derived from the application-level identifier may include only the QMC identifier (e.g., omitting the MCC and the MNC) or only the QMC identifier and the MNC (e.g., omitting the MCC). In another example, the derivation rules may specify that the access stratum identifier corresponds to a set of leftmost bits or a set of rightmost bits in the application-level identifier. In some aspects, the OAM server may provide the QoE measurement configuration and the application-level identifier to the base station 110, and the base station 110 may derive the access stratum identifier (e.g., the shortened or truncated version of the application-level identifier) based on the appropriate derivation rule(s). Alternatively, the OAM server may derive the access stratum identifier based on the appropriate derivation rule(s) and provide the access stratum identifier to the base station 110 together with the QoE measurement configuration and the application-level identifier.

In some aspects, the access stratum identifier that is derived from the application-level identifier may be defined to be unique within the scope of a RAN that includes the base station 110 (e.g., to enable management-based QoE measurement), unique within the scope of a cell provided by the base station 110, or unique within the scope of the UE 120 (e.g., to enable signaling-based QoE measurement). In some aspects, the base station 110 may allocate the access stratum identifier based on a service type associated with the QoE measurement configuration and/or a network slice associated with the QoE measurement configuration. Furthermore, in some aspects, there may be a one-to-one (1:1) mapping between an application-level identifier and the access stratum identifier or an N-to-one (N:1) mapping between multiple application-level identifiers and the same access stratum identifier. In the latter case, where there is an N:1 mapping between multiple application-level identifiers and the same access stratum identifier, the N application-level identifiers may generally belong to the same OAM server such that the base station 110 may know the correct OAM server to which to forward application layer QoE measurements based on an access stratum identifier. For example, when the OAM server provides a QoE measurement configuration associated with an application-level identifier and the base station 110 allocates an access stratum identifier that is derived from the application-level identifier, the base station 110 may store a mapping or other relationship between the access stratum and the application-level identifier. In this way, when the base station 110 receives a QoE report from the UE 120 that includes the access stratum identifier, the base station 110 may determine the OAM server that provided the QoE measurement configuration associated with the application-level identifier mapped to the access stratum identifier.

As further shown in FIG. 4, and by reference number 430, the base station 110 may transmit an RRC message that encapsulates the QoE measurement configuration to the UE 120, and the RRC message may include the access stratum identifier derived from the application-level identifier. As shown in FIG. 4, the QoE measurement configuration may be received at the access stratum layer of the UE 120. As an example, the base station 110 may transmit an RRC reconfiguration (e.g., RR(Reconfiguration) message that indicates the QoE measurement configuration and/or the access stratum identifier in a measConfigAppLayer information element. As described above, the QoE measurement configuration may identify one or more QoE measurements (e.g., relating to a quality of streaming services used in the UE 120) that are to be collected by the UE 120. The QoE measurement configuration also may identify one or more service types for which the UE 120 is to perform QoE measurements (e.g., MTSI, a streaming service, and/or MBMS).

In some aspects, when the UE 120 receives the RRC message that encapsulates the QoE measurement configuration from the base station 110, the UE 120 may process the access stratum identifier included in the RRC message to determine a mapping or other relationship between the application-level identifier associated with the QoE measurement configuration and the access stratum identifier used to identify the QoE measurement configuration at the access stratum layer. For example, in some aspects, the access stratum layer may forward the application-level QoE measurement configuration to the application layer, and the application layer may decode the application-level identifier associated with the application-level QoE measurement configuration. The application layer may then provide the application-level identifier to the access stratum layer, and the access stratum layer may store a mapping between the access stratum identifier and the application-level identifier. In this way, when the application layer provides application layer QoE measurements to be reported to the access stratum layer, the application layer may provide the application-level identifier to the access stratum layer, and the access stratum layer may derive the access stratum identifier from the application-level identifier based on the mapping.

Alternatively, in some aspects, the access stratum layer may forward the application-level QoE measurement configuration and the access stratum identifier to the application layer, and the application layer may decode the application-level identifier associated with the application-level QoE measurement configuration. In this case, the application layer may store the mapping between the access stratum identifier and the application-level identifier. In this way, when the application layer provides application layer QoE measurements to be reported to the access stratum layer, the application layer may provide the access stratum identifier to the access stratum layer together with the application layer QoE measurements. Alternatively, in some aspects, the access stratum layer may store a mapping between the access stratum identifier received in the RRC message encapsulating the QoE measurement configuration and the corresponding application. In this way, when an application provides application layer QoE measurements to the access stratum layer, the access stratum layer may determine the appropriate access stratum identifier to associate with the application layer QoE measurements based on an identity of the application that provided the application layer QoE measurements to the access stratum layer.

As further shown in FIG. 4, and by reference number 440, the access stratum layer of the UE 120 may provide, to the application layer of the UE 120, a command to initiate an application layer QoE measurement based on the access stratum identifier (e.g., an AT command to initiate QoE measurement collection at the application layer). As further shown in FIG. 4, and by reference number 450, the application layer may provide application layer QoE measurements to the access stratum layer. The application layer QoE measurements may be per service type indicated by the QoE measurement configuration. Furthermore, as described herein, the application layer QoE measurements may be associated with the application-level identifier associated with the QoE measurement configuration. For example, when providing the command to initiate the QoE measurement collection, the access stratum may forward the QoE measurement configuration to the application layer, and the application layer may decode the application-level identifier included in the QoE measurement configuration. In some aspects, the application layer may provide the decoded application-level identifier to the access stratum layer, which may store information related to a mapping between the access stratum identifier and the application-level identifier. Accordingly, when the application layer returns application layer QoE measurements to the access stratum layer, the application layer may further provide the application-level identifier associated with the application layer QoE measurements. In this way, the access stratum layer may derive the access stratum identifier (e.g., the shortened or truncated version of the application-level identifier) based on the mapping.

Alternatively, when providing the command to initiate the QoE measurement collection, the access stratum may forward the QoE measurement configuration and the access stratum identifier to the application layer, and the application layer may decode the application-level identifier included in the QoE measurement configuration (e.g., based on the QoE measurement configuration and/or one or more derivation rules). In some aspects, the application layer may store information related to the mapping between the access stratum identifier and the application-level identifier. Accordingly, when the application layer returns application layer QoE measurements to the access stratum layer, the application layer may further provide the access stratum identifier associated with the application layer QoE measurements based on the mapping. Alternatively, the access stratum layer may store information associating the access stratum identifier included in the RRC message providing the QoE measurement configuration and the corresponding application at the application layer, in which case the access stratum layer may determine the access stratum identifier associated with application layer QoE measurements returned from the application layer based on the application that provided or obtained the application layer QoE measurements.

As further shown in FIG. 4, and by reference number 460, the UE 120 may transmit (e.g., using the access stratum layer), and the base station 110 may receive, a QoE report message that includes the application layer QoE measurements and the access stratum identifier derived from the application-level identifier associated with the application layer QoE measurements. For example, the UE 120 may encapsulate the application layer QoE measurements in a transparent container that is transmitted to the base station 110 (e.g., in an uplink RRC message). As an example, the UE 120 may transmit a measReportAppLayer message that includes the QoE report with the application layer QoE measurements collected by the UE 120. For example, the QoE report may identify the application layer QoE measurements collected by the UE 120 (e.g., per service type). The UE 120 may transmit the QoE report via the SRB for QoE reporting (e.g., SRB4), which is a separate SRB (e.g., separate from current NR SRBs) for the lower-priority (e.g., relative to other SRB transmissions) QoE reporting.

In some aspects, as described herein, the access stratum layer of the UE 120 may include the access stratum identifier derived from the application-level identifier in the RRC message that is transmitted to provide the QoE report with the application layer QoE measurements. Accordingly, when the base station 110 receives the QoE report from the access stratum layer of the UE 120, the base station may determine the application-level identifier associated with the access stratum identifier (e.g., the base station 110 may determine the full application-level identifier based on the access stratum identifier, which is a shortened, truncated, or otherwise derived version of the application-level identifier). In this way, the base station 110 may determine the OAM server associated with the application-level identifier. Alternatively, in some aspects, the base station 110 may store information associating the OAM server with the access stratum identifier such that the base station 110 may determine the OAM server associated with the QoE report based on the access stratum identifier included in the RRC message that provides the QoE report. As further shown in FIG. 4, and by reference number 470, the base station 110 may then forward the QoE report to the OAM entity associated with the application-level identifier or access stratum identifier.

As indicated above, FIG. 4 is provided as an example. Other examples may differ from what is described with regard to FIG. 4.

Figure 5:
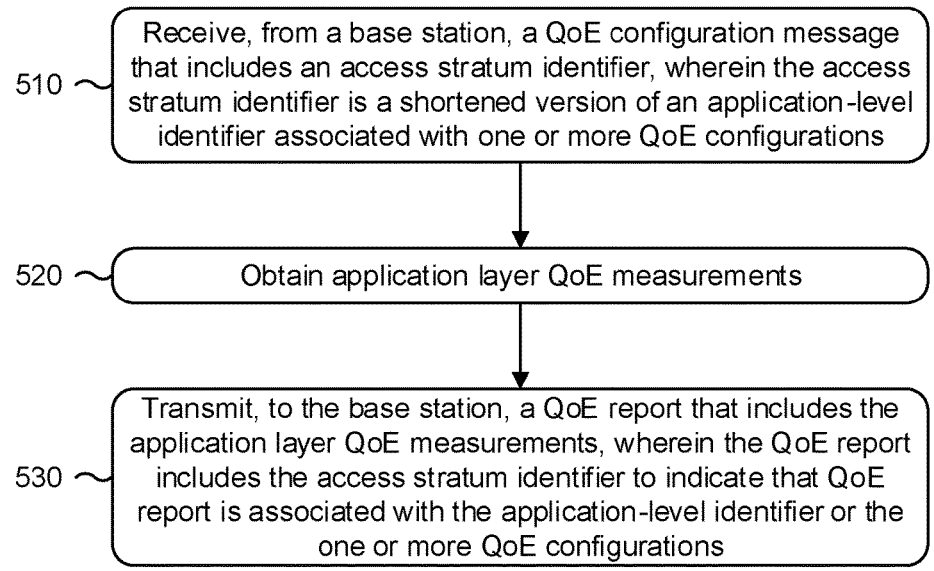
FIGS. 5-6 are diagrams illustrating example processes associated with an identifier configuration to support QoE measurements, in accordance with the present disclosure.

FIG. 5 is a diagram illustrating an example process 500 performed, for example, by a UE 120, in accordance with the present disclosure. Example process 500 is an example where the UE (e.g., UE 120) performs operations associated with an identifier configuration to support QoE measurements.

As shown in FIG. 5, in some aspects, process 500 may include receiving, from a base station, a QoE configuration message that includes an access stratum identifier, wherein the access stratum identifier is a shortened version of an application-level identifier associated with one or more QoE configurations (block 510). For example, the UE (e.g., using communication manager 140 and/or reception component 702, depicted in FIG. 7) may receive, from a base station, a QoE configuration message that includes an access stratum identifier, wherein the access stratum identifier is a shortened version of an application-level identifier associated with one or more QoE configurations, as described above.

As further shown in FIG. 5, in some aspects, process 500 may include obtaining application layer QoE measurements (block 520). For example, the UE (e.g., using communication manager 140 and/or measurement component 708, depicted in FIG. 7) may obtain application layer QoE measurements, as described above.

As further shown in FIG. 5, in some aspects, process 500 may include transmitting, to the base station, a QoE report that includes the application layer QoE measurements, wherein the QoE report includes the access stratum identifier to indicate that the QoE report is associated with the application-level identifier or the one or more QoE configurations (block 530). For example, the UE (e.g., using communication manager 140 and/or transmission component 704, depicted in FIG. 7) may transmit, to the base station, a QoE report that includes the application layer QoE measurements, wherein the QoE report includes the access stratum identifier to indicate that the QoE report is associated with the application-level identifier or the one or more QoE configurations, as described above.

Process 500 may include additional aspects, such as any single aspect or any combination of aspects described below and/or in connection with one or more other processes described elsewhere herein.

In a first aspect, process 500 includes receiving, at an access stratum layer, the application layer QoE measurements and information that indicates the application-level identifier, and determining the shortened version of the application-level identifier used as the access stratum identifier based at least in part on one or more derivation rules.

In a second aspect, alone or in combination with the first aspect, process 500 includes receiving, at an access stratum layer, the application layer QoE measurements and information indicating the shortened version of the application-level identifier.

In a third aspect, alone or in combination with one or more of the first and second aspects, process 500 includes storing, at an access stratum layer, information associating an application with the access stratum identifier included in the QoE measurement configuration, and receiving the application layer QoE measurements from the application, wherein the QoE report includes the access stratum identifier based at least in part on the information associating the application with the access stratum identifier.

In a fourth aspect, alone or in combination with one or more of the first through third aspects, the access stratum identifier identifies the one or more QoE configurations in an access stratum layer.

In a fifth aspect, alone or in combination with one or more of the first through fourth aspects, the access stratum identifier includes a set of leftmost bits or a set of rightmost bits in the application-level identifier.

In a sixth aspect, alone or in combination with one or more of the first through fifth aspects, the application-level identifier includes an MCC, an MNC, and a QMC identifier, and the access stratum identifier includes only the QMC identifier or only the MNC and the QMC identifier.

In a seventh aspect, alone or in combination with one or more of the first through sixth aspects, process 500 includes decoding the application-level identifier based at least in part on the access stratum identifier included in the QoE configuration message, storing a mapping between the access stratum identifier and one or more of the application-level identifier or the one or more QoE configurations based at least in part on the decoding, and including the access stratum identifier in the QoE report according to the mapping based at least in part on an application layer indicating that the application layer QoE measurements are associated with the application-level identifier, the shortened version of the application-level identifier, or the one or more QoE configurations.

In an eighth aspect, alone or in combination with one or more of the first through seventh aspects, the access stratum identifier is unique within a scope of one or more of a RAN, a cell of the RAN, or the UE.

In a ninth aspect, alone or in combination with one or more of the first through eighth aspects, the application-level identifier and the access stratum identifier have a one-to-one mapping or an N-to-one mapping.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
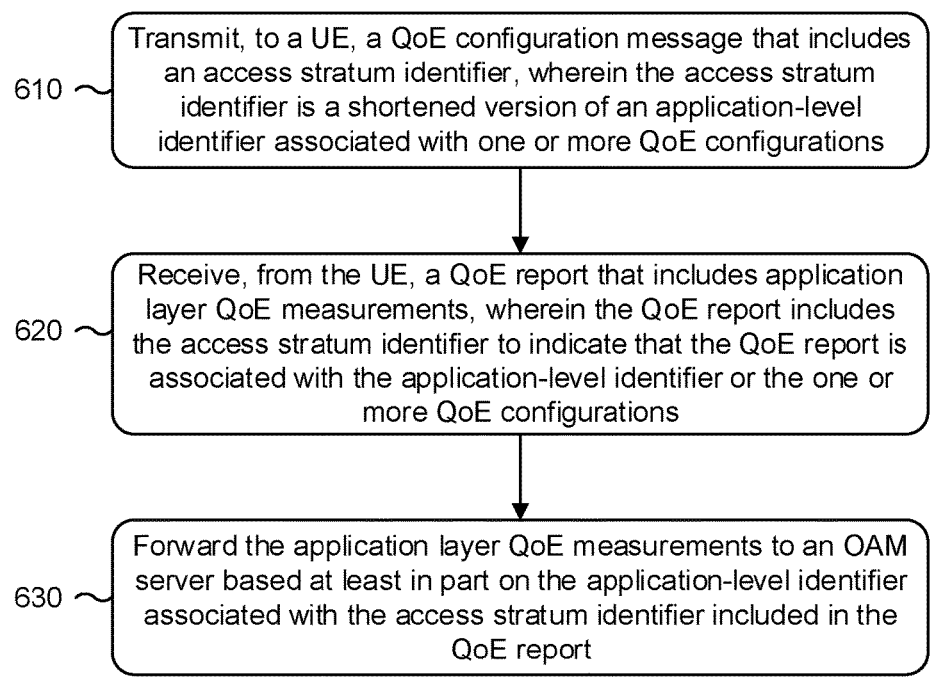

FIG. 6 is a diagram illustrating an example process 600 performed, for example, by a base station, in accordance with the present disclosure. Example process 600 is an example where the base station (e.g., base station 110) performs operations associated with an identifier configuration to support QoE measurements.

As shown in FIG. 6, in some aspects, process 600 may include transmitting, to a UE, a QoE configuration message that includes an access stratum identifier, wherein the access stratum identifier is a shortened version of an application-level identifier associated with one or more QoE configurations (block 610). For example, the base station (e.g., using communication manager 150 and/or transmission component 804, depicted in FIG. 8) may transmit, to a UE, a QoE configuration message that includes an access stratum identifier, wherein the access stratum identifier is a shortened version of an application-level identifier associated with one or more QoE configurations, as described above.

As further shown in FIG. 6, in some aspects, process 600 may include receiving, from the UE, a QoE report that includes application layer QoE measurements, wherein the QoE report includes the access stratum identifier to indicate that the QoE report is associated with the application-level identifier or the one or more QoE configurations (block 620). For example, the base station (e.g., using communication manager 150 and/or reception component 802, depicted in FIG. 8) may receive, from the UE, a QoE report that includes application layer QoE measurements, wherein the QoE report includes the access stratum identifier to indicate that the QoE report is associated with the application-level identifier or the one or more QoE configurations, as described above.

As further shown in FIG. 6, in some aspects, process 600 may include forwarding the application layer QoE measurements to an OAM server based at least in part on the application-level identifier associated with the access stratum identifier included in the QoE report (block 630). For example, the base station (e.g., using communication manager 150 and/or transmission component 804, depicted in FIG. 8) may forward the application layer QoE measurements to an OAM server based at least in part on the application-level identifier associated with the access stratum identifier included in the QoE report, as described above.

Process 600 may include additional aspects, such as any single aspect or any combination of aspects described below and/or in connection with one or more other processes described elsewhere herein.

In a first aspect, process 600 includes receiving, from the OAM server, the application-level identifier, and determining the shortened version of the application-level identifier used as the access stratum identifier based at least in part on one or more derivation rules.

In a second aspect, alone or in combination with the first aspect, process 600 includes receiving, from the OAM server, the application-level identifier and information indicating the shortened version of the application-level identifier.

In a third aspect, alone or in combination with one or more of the first and second aspects, the access stratum identifier identifies the one or more QoE configurations in an access stratum layer.

In a fourth aspect, alone or in combination with one or more of the first through third aspects, the access stratum identifier includes a set of leftmost bits or a set of rightmost bits in the application-level identifier.

In a fifth aspect, alone or in combination with one or more of the first through fourth aspects, the application-level identifier includes an MCC, an MNC, and a QMC identifier, and the access stratum identifier includes only the QMC identifier or only the MNC and the QMC identifier.

In a sixth aspect, alone or in combination with one or more of the first through fifth aspects, process 600 includes determining the application-level identifier associated with the QoE report based at least in part on the access stratum identifier included in the QoE report, and determining the OAM server to which to forward the application layer QoE measurements based at least in part on the application-level identifier associated with the QoE report.

In a seventh aspect, alone or in combination with one or more of the first through sixth aspects, process 600 includes storing information associating the access stratum identifier with the OAM server, and determining the OAM server to which to forward the application layer QoE measurements based at least in part on the QoE report including the access stratum identifier associated with the OAM server.

In an eighth aspect, alone or in combination with one or more of the first through seventh aspects, the access stratum identifier is unique within a scope of one or more of a RAN, a cell of the RAN, or the UE.

In a ninth aspect, alone or in combination with one or more of the first through eighth aspects, the application-level identifier and the access stratum identifier have a one-to-one mapping or an N-to-one mapping.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
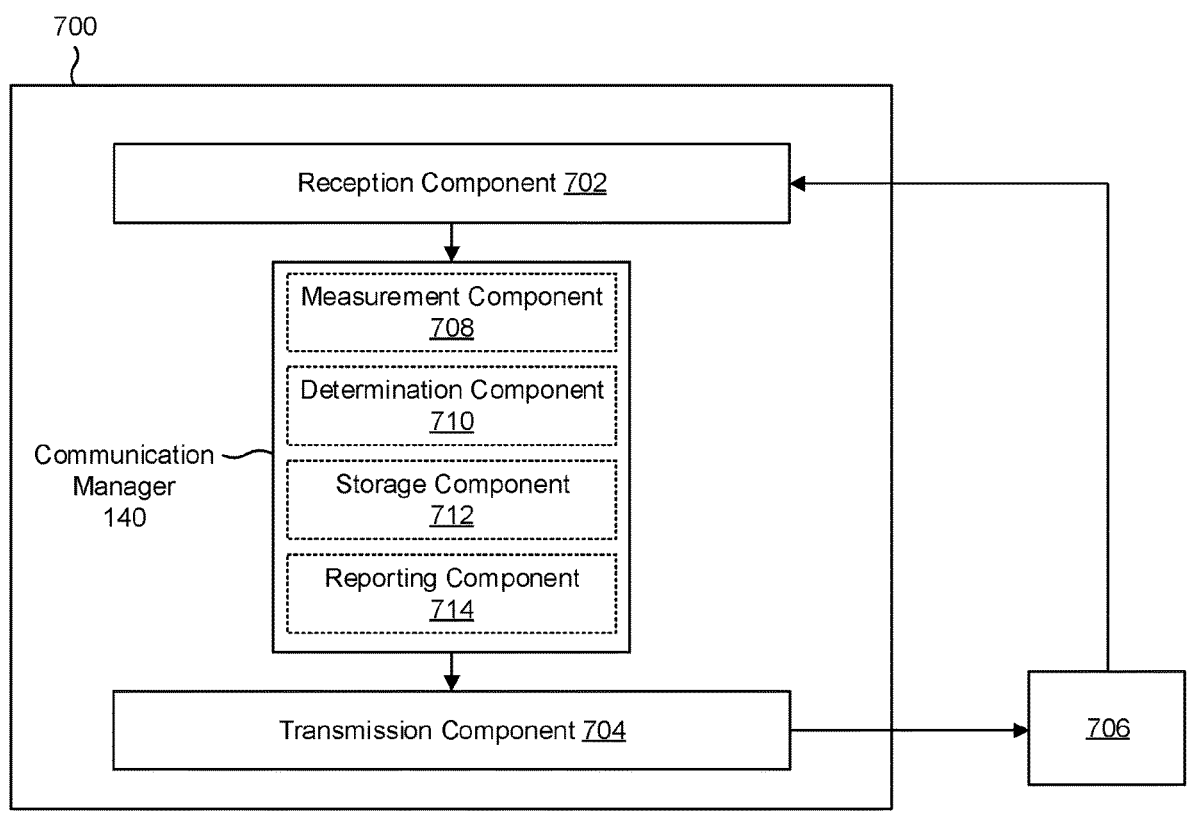
FIGS. 7-8 are block diagrams of example apparatuses for wireless communication, in accordance with the present disclosure.

FIG. 7 is a block diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 140. The communication manager 140 may include one or more of a measurement component 708, a determination component 710, a storage component 712, or a reporting component 714, among other examples.

In some aspects, the apparatus 700 may be configured to perform one or more operations described herein in connection with FIG. 4. Additionally, or alternatively, the apparatus 700 may be configured to perform one or more processes described herein, such as process 500 of FIG. 5. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be co-located with the reception component 702 in a transceiver.

The reception component 702 may receive, from a base station, a QoE configuration message that includes an access stratum identifier, wherein the access stratum identifier is a shortened version of an application-level identifier associated with one or more QoE configurations. The measurement component 708 may obtain application layer QoE measurements. The transmission component 704 may transmit, to the base station, a QoE report that includes the application layer QoE measurements, wherein the QoE report includes the access stratum identifier to indicate that the QoE report is associated with the application-level identifier or the one or more QoE configurations.

The reception component 702 may receive, at an access stratum layer, the application layer QoE measurements and information that indicates the application-level identifier. The determination component 710 may determine the shortened version of the application-level identifier used as the access stratum identifier based at least in part on one or more derivation rules.

The reception component 702 may receive, at an access stratum layer, the application layer QoE measurements and information indicating the shortened version of the application-level identifier.

The storage component 712 may store, at an access stratum layer, information associating an application with the access stratum identifier included in the QoE measurement configuration. The reception component 702 may receive the application layer QoE measurements from the application, wherein the QoE report includes the access stratum identifier based at least in part on the information associating the application with the access stratum identifier.

The determination component 710 may decode the application-level identifier based at least in part on the access stratum identifier included in the QoE configuration message. The storage component 712 may store a mapping between the access stratum identifier and one or more of the application-level identifier or the one or more QoE configurations based at least in part on the decoding. The reporting component 714 may include the access stratum identifier in the QoE report according to the mapping based at least in part on an application layer indicating that the application layer QoE measurements are associated with the application-level identifier, the shortened version of the application-level identifier, or the one or more QoE configurations.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
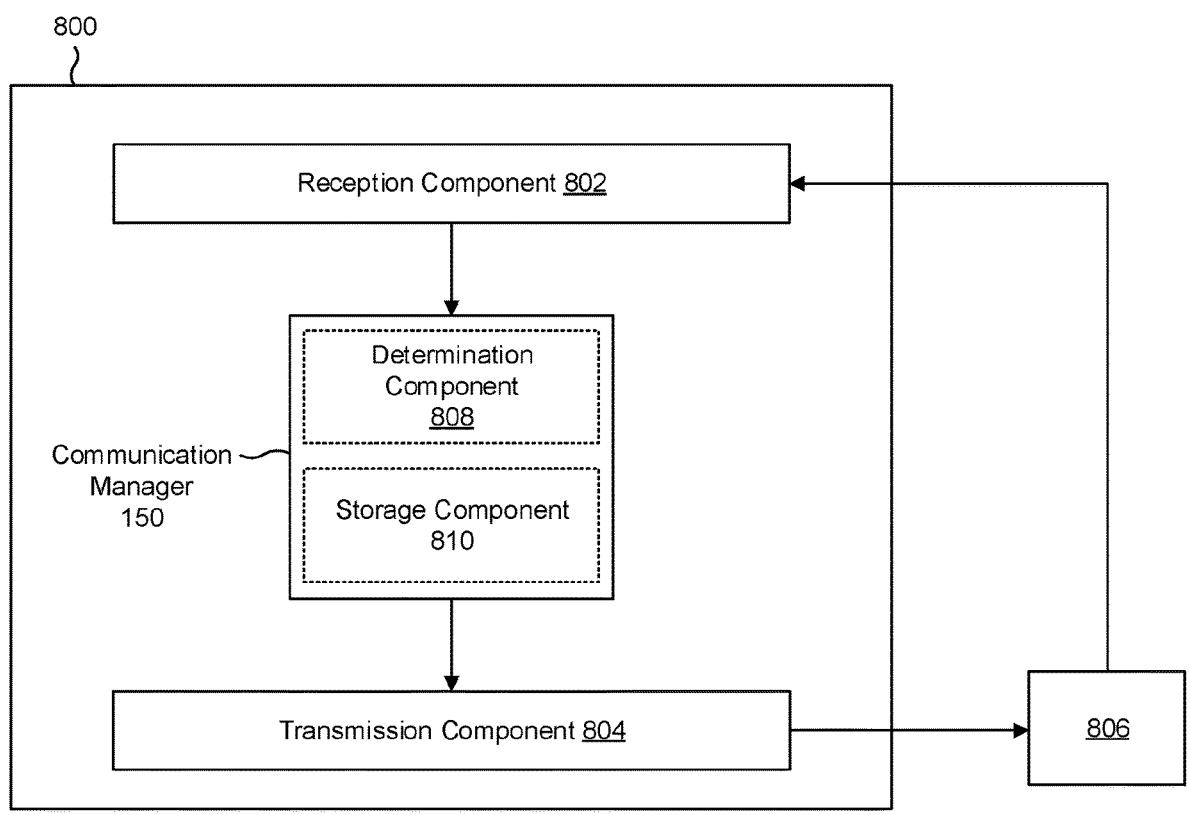

FIG. 8 is a block diagram of an example apparatus 800 for wireless communication. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 150. The communication manager 150 may include one or more of a determination component 808 or a storage component 810, among other examples.

In some aspects, the apparatus 800 may be configured to perform one or more operations described herein in connection with FIG. 4. Additionally, or alternatively, the apparatus 800 may be configured to perform one or more processes described herein, such as process 600 of FIG. 6. In some aspects, the apparatus 800 and/or one or more components shown in FIG. 8 may include one or more components of the base station described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the base station described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the base station described above in connection with FIG. 2. In some aspects, the transmission component 804 may be co-located with the reception component 802 in a transceiver.

The transmission component 804 may transmit, to a UE, a QoE configuration message that includes an access stratum identifier, wherein the access stratum identifier is a shortened version of an application-level identifier associated with one or more QoE configurations. The reception component 802 may receive, from the UE, a QoE report that includes application layer QoE measurements, wherein the QoE report includes the access stratum identifier to indicate that the QoE report is associated with the application-level identifier or the one or more QoE configurations. The transmission component 804 may forward the application layer QoE measurements to an OAM server based at least in part on the application-level identifier associated with the access stratum identifier included in the QoE report.

The reception component 802 may receive, from the OAM server, the application-level identifier. The determination component 808 may determine the shortened version of the application-level identifier used as the access stratum identifier based at least in part on one or more derivation rules.

The reception component 802 may receive, from the OAM server, the application-level identifier and information indicating the shortened version of the application-level identifier.

The determination component 808 may determine the application-level identifier associated with the QoE report based at least in part on the access stratum identifier included in the QoE report. The determination component 808 may determine the OAM server to which to forward the application layer QoE measurements based at least in part on the application-level identifier associated with the QoE report.

The storage component 810 may store information associating the access stratum identifier with the OAM server. The determination component 808 may determine the OAM server to which to forward the application layer QoE measurements based at least in part on the QoE report including the access stratum identifier associated with the OAM server.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a UE, comprising: receiving, from a base station, a QoE configuration message that includes an access stratum identifier, wherein the access stratum identifier is a shortened version of an application-level identifier associated with one or more QoE configurations; obtaining application layer QoE measurements; and transmitting, to the base station, a QoE report that includes the application layer QoE measurements, wherein the QoE report includes the access stratum identifier to indicate that the QoE report is associated with the application-level identifier or the one or more QoE configurations.

Aspect 2: The method of Aspect 1, further comprising: receiving, at an access stratum layer, the application layer QoE measurements and information that indicates the application-level identifier; and determining the shortened version of the application-level identifier used as the access stratum identifier based at least in part on one or more derivation rules.

Aspect 3: The method of Aspect 1, further comprising: receiving, at an access stratum layer, the application layer QoE measurements and information indicating the shortened version of the application-level identifier.

Aspect 4: The method of any of Aspects 1-3, further comprising: storing, at an access stratum layer, information associating an application with the access stratum identifier included in the QoE measurement configuration; and receiving the application layer QoE measurements from the application, wherein the QoE report includes the access stratum identifier based at least in part on the information associating the application with the access stratum identifier.

Aspect 5: The method of any of Aspects 1-4, wherein the access stratum identifier identifies the one or more QoE configurations in an access stratum layer.

Aspect 6: The method of any of Aspects 1-5, wherein the access stratum identifier includes a set of leftmost bits or a set of rightmost bits in the application-level identifier.

Aspect 7: The method of any of Aspects 1-6, wherein the application-level identifier includes an MCC, an MNC, and a QMC identifier, and wherein the access stratum identifier includes only the QMC identifier or only the MNC and the QMC identifier.

Aspect 8: The method of any of Aspects 1-7, further comprising: decoding the application-level identifier based at least in part on the access stratum identifier included in the QoE configuration message; storing a mapping between the access stratum identifier and one or more of the application-level identifier or the one or more QoE configurations based at least in part on the decoding; and including the access stratum identifier in the QoE report according to the mapping based at least in part on an application layer indicating that the application layer QoE measurements are associated with the application-level identifier, the shortened version of the application-level identifier, or the one or more QoE configurations.

Aspect 9: The method of any of Aspects 1-8, wherein the access stratum identifier is unique within a scope of one or more of a RAN, a cell of the RAN, or the UE.

Aspect 10: The method of any of Aspects 1-9, wherein the application-level identifier and the access stratum identifier have a one-to-one mapping or an N-to-one mapping.

Aspect 11: A method of wireless communication performed by a base station, comprising: transmitting, to a UE, a QoE configuration message that includes an access stratum identifier, wherein the access stratum identifier is a shortened version of an application-level identifier associated with one or more QoE configurations; receiving, from the UE, a QoE report that includes application layer QoE measurements, wherein the QoE report includes the access stratum identifier to indicate that the QoE report is associated with the application-level identifier or the one or more QoE configurations; and forwarding the application layer QoE measurements to an OAM server based at least in part on the application-level identifier associated with the access stratum identifier included in the QoE report.

Aspect 12: The method of Aspect 11, further comprising: receiving, from the OAM server, the application-level identifier; and determining the shortened version of the application-level identifier used as the access stratum identifier based at least in part on one or more derivation rules.

Aspect 13: The method of Aspect 11, further comprising: receiving, from the OAM server, the application-level identifier and information indicating the shortened version of the application-level identifier.

Aspect 14: The method of any of Aspects 11-13, wherein the access stratum identifier identifies the one or more QoE configurations in an access stratum layer.

Aspect 15: The method of any of Aspects 11-14, wherein the access stratum identifier includes a set of leftmost bits or a set of rightmost bits in the application-level identifier.

Aspect 16: The method of any of Aspects 11-15, wherein the application-level identifier includes an MCC, an MNC, and a QMC identifier, and wherein the access stratum identifier includes only the QMC identifier or only the MNC and the QMC identifier.

Aspect 17: The method of any of Aspects 11-16, further comprising: determining the application-level identifier associated with the QoE report based at least in part on the access stratum identifier included in the QoE report; and determining the OAM server to which to forward the application layer QoE measurements based at least in part on the application-level identifier associated with the QoE report.

Aspect 18: The method of any of Aspects 11-16, further comprising: storing information associating the access stratum identifier with the OAM server; and determining the OAM server to which to forward the application layer QoE measurements based at least in part on the QoE report including the access stratum identifier associated with the OAM server.

Aspect 19: The method of any of Aspects 11-18, wherein the access stratum identifier is unique within a scope of one or more of a RAN, a cell of the RAN, or the UE.

Aspect 20: The method of any of Aspects 11-19, wherein the application-level identifier and the access stratum identifier have a one-to-one mapping or an N-to-one mapping.

Aspect 21: An apparatus for wireless communication at a device, comprising a processor; memory coupled with the processor; and instructions stored in the memory and executable by the processor to cause the apparatus to perform the method of any of Aspects 1-10.

Aspect 22: A device for wireless communication, comprising a memory and one or more processors coupled to the memory, the memory and the one or more processors configured to perform the method of any of Aspects 1-10.

Aspect 23: An apparatus for wireless communication, comprising at least one means for performing the method of any of Aspects 1-10.

Aspect 24: A non-transitory computer-readable medium storing code for wireless communication, the code comprising instructions executable by a processor to perform the method of any of Aspects 1-10.

Aspect 25: A non-transitory computer-readable medium storing a set of instructions for wireless communication, the set of instructions comprising one or more instructions that, when executed by one or more processors of a device, cause the device to perform the method of any of Aspects 1-10.

Aspect 26: An apparatus for wireless communication at a device, comprising a processor; memory coupled with the processor; and instructions stored in the memory and executable by the processor to cause the apparatus to perform the method of any of Aspects 11-20.

Aspect 27: A device for wireless communication, comprising a memory and one or more processors coupled to the memory, the memory and the one or more processors configured to perform the method of any of Aspects 11-20.

Aspect 28: An apparatus for wireless communication, comprising at least one means for performing the method of any of Aspects 11-20.

Aspect 29: A non-transitory computer-readable medium storing code for wireless communication, the code comprising instructions executable by a processor to perform the method of any of Aspects 11-20.

Aspect 30: A non-transitory computer-readable medium storing a set of instructions for wireless communication, the set of instructions comprising one or more instructions that, when executed by one or more processors of a device, cause the device to perform the method of any of Aspects 11-20.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
  a memory; and
  one or more processors, coupled to the memory, configured to:

receive, from a base station, a quality of experience (QoE) configuration message that includes an access stratum identifier, wherein the access stratum identifier is a shortened version of an application-level identifier associated with one or more QoE configurations;

obtain application layer QoE measurements; and transmit, to the base station, a QoE report that includes the application layer QoE measurements, wherein the QoE report includes the access stratum identifier to indicate that QoE report is associated with the application-level identifier or the one or more QoE configurations.

2. The UE of claim 1, wherein the one or more processors are further configured to:

receive, at an access stratum layer, the application layer QoE measurements and information that indicates the application-level identifier; and determine the shortened version of the application-level identifier used as the access stratum identifier based at least in part on one or more derivation rules.

3. The UE of claim 1, wherein the one or more processors are further configured to:

receive, at an access stratum layer, the application layer QoE measurements and information indicating the shortened version of the application-level identifier.

4. The UE of claim 1, wherein the one or more processors are further configured to:

store, at an access stratum layer, information associating an application with the access stratum identifier included in the QoE measurement configuration; and receive the application layer QoE measurements from the application, wherein the QoE report includes the access stratum identifier based at least in part on the information associating the application with the access stratum identifier.

5. The UE of claim 1, wherein the access stratum identifier identifies the one or more QoE configurations in an access stratum layer.

6. The UE of claim 1, wherein the access stratum identifier includes a set of leftmost bits or a set of rightmost bits in the application-level identifier.

7. The UE of claim 1, wherein the application-level identifier includes a mobile country code (MCC), a mobile network code (MNC), and a QoE measurement collection (QMC) identifier, and wherein the access stratum identifier includes only the QMC identifier or only the MNC and the QMC identifier.

8. The UE of claim 1, wherein the one or more processors are further configured to:

decode the application-level identifier based at least in part on the access stratum identifier included in the QoE configuration message;

store a mapping between the access stratum identifier and one or more of the application-level identifier or the one or more QoE configurations based at least in part on the decoding; and include the access stratum identifier in the QoE report according to the mapping based at least in part on an application layer indicating that the application layer QoE measurements are associated with the application-level identifier, the shortened version of the application-level identifier, or the one or more QoE configurations.

9. The UE of claim 1, wherein the access stratum identifier is unique within a scope of one or more of a radio access network (RAN), a cell of the RAN, or the UE.

10. The UE of claim 1, wherein the application-level identifier and the access stratum identifier have a one-to-one mapping or an N-to-one mapping.

11. A base station for wireless communication, comprising:

a memory; and one or more processors, coupled to the memory, configured to:

transmit, to a user equipment (UE), a quality of experience (QoE) configuration message that includes an access stratum identifier, wherein the access stratum identifier is a shortened version of an application-level identifier associated with one or more QoE configurations;

receive, from the UE, a QoE report that includes application layer QoE measurements, wherein the QoE report includes the access stratum identifier to indicate that the QoE report is associated with the application-level identifier or the one or more QoE configurations; and forward the application layer QoE measurements to an operations, administration, and management (OAM) server based at least in part on the application-level identifier associated with the access stratum identifier included in the QoE report.

12. The base station of claim 11, wherein the one or more processors are further configured to:

receive, from the OAM server, the application-level identifier; and determine the shortened version of the application-level identifier used as the access stratum identifier based at least in part on one or more derivation rules.

13. The base station of claim 11, wherein the one or more processors are further configured to:

receive, from the OAM server, the application-level identifier and information indicating the shortened version of the application-level identifier.

14. The base station of claim 11, wherein the access stratum identifier identifies the one or more QoE configurations in an access stratum layer.

15. The base station of claim 11, wherein the access stratum identifier includes a set of leftmost bits or a set of rightmost bits in the application-level identifier.

16. The base station of claim 11, wherein the application-level identifier includes a mobile country code (MCC), a mobile network code (MNC), and a QoE measurement collection (QMC) identifier, and wherein the access stratum identifier includes only the QMC identifier or only the MNC and the QMC identifier.

17. The base station of claim 11, wherein the one or more processors are further configured to:

determine the application-level identifier associated with the QoE report based at least in part on the access stratum identifier included in the QoE report; and determine the OAM server to which to forward the application layer QoE measurements based at least in part on the application-level identifier associated with the QoE report.

18. The base station of claim 11, wherein the one or more processors are further configured to:

store information associating the access stratum identifier with the OAM server; and determine the OAM server to which to forward the application layer QoE measurements based at least in part on the QoE report including the access stratum identifier associated with the OAM server.

19. The base station of claim 11, wherein the access stratum identifier is unique within a scope of one or more of a radio access network (RAN), a cell of the RAN, or the UE.

20. The base station of claim 11, wherein the application-level identifier and the access stratum identifier have a one-to-one mapping or an N-to-one mapping.

21. A method of wireless communication performed by a user equipment (UE), comprising:
receiving, from a base station, a quality of experience (QoE) configuration message that includes an access stratum identifier, wherein the access stratum identifier is a shortened version of an application-level identifier associated with one or more QoE configurations;
obtaining application layer QoE measurements; and
transmitting, to the base station, a QoE report that includes the application layer QoE measurements, wherein the QoE report includes the access stratum identifier to indicate that the QoE report is associated with the application-level identifier or the one or more QoE configurations.

22. The method of claim 21, further comprising:
receiving, at an access stratum layer, the application layer QoE measurements and information that indicates the application-level identifier; and
determining the shortened version of the application-level identifier used as the access stratum identifier based at least in part on one or more derivation rules.

23. The method of claim 21, further comprising:
receiving, at an access stratum layer, the application layer QoE measurements and information indicating the shortened version of the application-level identifier.

24. The method of claim 21, further comprising:
storing, at an access stratum layer, information associating an application with the access stratum identifier included in the QoE measurement configuration; and
receiving the application layer QoE measurements from the application, wherein the QoE report includes the access stratum identifier based at least in part on the information associating the application with the access stratum identifier.

25. The method of claim 21, wherein the access stratum identifier identifies the one or more QoE configurations in an access stratum layer, or includes a set of leftmost bits or a set of rightmost bits in the application-level identifier.

26. The method of claim 21, wherein the application-level identifier includes a mobile country code (MCC), a mobile network code (MNC), and a QoE measurement collection (QMC) identifier, and wherein the access stratum identifier includes only the QMC identifier or only the MNC and the QMC identifier.

27. The method of claim 21, further comprising:
decoding the application-level identifier based at least in part on the access stratum identifier included in the QoE configuration message;
storing a mapping between the access stratum identifier and one or more of the application-level identifier or the one or more QoE configurations based at least in part on the decoding; and
including the access stratum identifier in the QoE report according to the mapping based at least in part on an application layer indicating that the application layer QoE measurements are associated with the application-level identifier, the shortened version of the application-level identifier, or the one or more QoE configurations.

28. The method of claim 21, wherein the access stratum identifier is unique within a scope of one or more of a radio access network (RAN), a cell of the RAN, or the UE.

29. The method of claim 21, wherein the application-level identifier and the access stratum identifier have a one-to-one mapping or an N-to-one mapping.

30. A method of wireless communication performed by a base station, comprising:
transmitting, to a user equipment (UE), a quality of experience (QoE) configuration message that includes an access stratum identifier, wherein the access stratum identifier is a shortened version of an application-level identifier associated with one or more QoE configurations;
receiving, from the UE, a QoE report that includes application layer QoE measurements, wherein the QoE report includes the access stratum identifier to indicate that the QoE report is associated with the application-level identifier or the one or more QoE configurations; and
forwarding the application layer QoE measurements to an operations, administration, and management (OAM) server based at least in part on the application-level identifier associated with the access stratum identifier included in the QoE report.

* * * * *